(12) United States Patent
Yuergens

(10) Patent No.: US 6,745,880 B1
(45) Date of Patent: Jun. 8, 2004

(54) TWO-WAY CLUTCH ASSEMBLY HAVING SELECTIVE ACTUATION

(75) Inventor: Kenneth C. Yuergens, Farmington Hills, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/356,907

(22) Filed: Feb. 3, 2003

(51) Int. Cl.⁷ .................................................. F16D 11/06
(52) U.S. Cl. ....................... 192/44; 192/85 C; 192/93 A
(58) Field of Search ....................... 192/44, 84.6, 48.92, 192/93 A, 85 CA, 85 AA, 84.7, 35, 85 C

(56) References Cited

U.S. PATENT DOCUMENTS

| | | | |
|---|---|---|---|
| 1,831,955 A | 11/1931 | Harney | |
| 2,173,044 A | 9/1939 | Ruggles et al. | 180/44 |
| 2,290,089 A | 7/1942 | Bock | 180/49 |
| 2,551,939 A | 5/1951 | Gerst | 192/48 |
| 2,887,201 A | 5/1959 | Willis | 192/67 |
| 2,906,383 A | 9/1959 | Gabriel | 192/85 |
| 2,969,134 A | 1/1961 | Wiedmann et al. | 192/84 |
| 3,481,436 A | 12/1969 | Wilkowski | 192/35 |
| 3,517,573 A | 6/1970 | Roper | 74/711 |
| 3,631,741 A | 1/1972 | Kelbel | 74/781 |
| 4,114,478 A | 9/1978 | Clauss | 74/781 |
| 4,407,387 A | 10/1983 | Lindbert | 180/247 |
| 5,152,726 A | 10/1992 | Lederman | 475/324 |
| 5,355,981 A | 10/1994 | Itoh et al. | 192/35 |
| 5,466,195 A | 11/1995 | Nogle et al. | 475/55 |
| 5,584,776 A | 12/1996 | Weilant et al. | 475/213 |
| 5,653,322 A | 8/1997 | Vasa et al. | 192/85 |
| 5,704,867 A | 1/1998 | Bowen | 475/221 |
| 5,918,715 A | 7/1999 | Ruth et al. | 192/46 |
| 6,149,543 A | 11/2000 | Breen | 475/269 |
| 6,550,594 B1 * | 4/2003 | Peura | 192/44 |

FOREIGN PATENT DOCUMENTS

WO    WO 99/45289    9/1999

* cited by examiner

*Primary Examiner*—Saul Rodriguez
(74) *Attorney, Agent, or Firm*—Bliss McGlynn, P.C.; Greg Dziegielewski

(57) ABSTRACT

A two-way clutch assembly (10) having an inner race (14), an outer race (20), and an engagement mechanism (22) disposed therebetween and operable to shift between a first position providing torque translation between the inner and outer races (14, 20) in one rotational direction while allowing relative freewheeling rotation between the inner and outer races (14, 20) in an opposite rotational direction. Furthermore, the engagement mechanism (22) is operable to shift to a second position that provides torque translation and relative freewheeling rotation between the inner and outer races (14, 20) in rotational directions opposite to that provided by the engagement mechanism when disposed in the first position. An actuator assembly (24) is operatively connected to the engagement mechanism (22) and acts to simultaneously move in an axial direction and rotate about the axis of rotation (A) in an indexing manner to shift the engagement mechanism (22) between the first and second positions.

18 Claims, 3 Drawing Sheets

TWO-WAY CLUTCH ASSEMBLY HAVING SELECTIVE ACTUATION

BACKGROUND OF THE INVENTION

1. Field of the Invention

The present invention relates, generally, to bi-directional or "two-way" clutch assemblies and, more specifically, to a two-way clutch assembly having selective actuation. In addition, the two-way clutch assembly of the present invention is particularly adapted for use in connection with a brake, clutch, or other holding device in a transmission to provide low and reverse gears.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets, which may include an inner gear, intermediate planet or pinion gears that are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission, transfer case or differential or the like. In addition, multi-disc friction devices also find use in industrial applications, such as wet brakes, for example, to brake the wheels on earth-moving equipment.

The multi-disc pack clutch or brake assembly has a clutch sub-assembly including a set of plates and a set of friction discs that are interleaved between one another. The plates and friction discs are bathed in a continual flow of lubricant and in "open pack" mode normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission, transfer case, or differential to provide various gear ratios in operation, or to brake a component.

When the discs are not engaged, there often remains a differential rotational speed between the drive and driven members that the clutch or brake bridges. Relative rotation between the friction discs and the plates during open-pack mode creates drag. This condition results in parasitic energy losses, reduces the efficiency of the transmission, transfer case or differential, and ultimately results in lower fuel efficiency.

In addition to multiple friction devices, one-way clutches are frequently employed in transmissions, transfer cases, and differentials to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Specifically in the case of low and reverse gears, the associated friction clutch operates in open pack mode when the transmission is in gears 2–5 and therefore generated parasitic losses in each of these gears. Still, the clutch is necessary for providing the proper holding torque in low and reverse gears. Accordingly, there remains a need in the art for a mechanism that can provide the appropriate holding torque for both low and rear gears in the transmission and yet results in less parasitic losses than are presently attributable to the multiple plate friction clutch used for this purpose. In addition, there is a need in the art for a device that continues to perform the functions of the one-way clutch as described above, particularly where the output speed of the transmission exceeds the input speed resulting in engine compression braking.

Partially in response to this problem, bi-directional or "two-way" overrunning clutches have been proposed in the related art for use in these circumstances. These bi-directional overrunning clutch assemblies typically employ an inner race, an outer race, and a plurality of rollers, pawl, or sprags as the engagement mechanism disposed therebetween. Some of the bi-directional overrunning clutches of the type known in the related art are, for the most part, designed to be self-actuating. While they appear to present a solution to certain problems identified above, they have not been widely employed in transmission, transfer cases, and differentials of the related art. These self-actuating bi-directional overrunning clutches are relatively mechanically complex and have certain physical limitations and drawbacks. One such drawback is that the inner and outer races of the presently known bi-directional clutches generally travel over a large angular distance between the engagement in one rotational direction to the engagement in the opposite rotational direction. This makes for undesirable driving conditions by causing hard lockups when changing directions and also brings about a short mechanical life due to the severe inherent impact forces of the engagement. Additionally, the self-actuating bi-directional clutches known in the related art cannot be selectively engaged in an efficient manner or to optimize the vehicle power output in response to varying driving conditions.

In an attempt to overcome these problems, bi-directional overrunning clutches that may be selectively actuated to change the direction of torque translation and overrunning operation have been proposed in the related art. Unfortunately, these devices generally suffer from the disadvantage that they are mechanically complex, difficult to control and are generally not cost effective.

Accordingly, there remains a need in the art for a bi-directional clutch that can be selectively actuated and controlled in a manner to provide driving comfort and offer efficient operating modes for various driving conditions while at the same time facilitating the reduction in parasitic losses derived from conventional multi-disc friction devices. Furthermore, there remains a need in the art for a controllable bi-directional overrunning clutch assembly that can be quickly and easily shifted to provide either torque translation or freewheeling operation in either rotational direction. In addition, there also remains a need in the art for a bi-directional clutch assembly that can be effectively shifted between operational modes without jamming of the engagement mechanism or other failures occurring at the interface between the inner and outer races of the clutch assembly.

SUMMARY OF THE INVENTION

The present invention overcomes the disadvantages in the related art in a two-way clutch assembly that includes an inner race, and an outer race where the inner and outer races are supported for rotation about a common axis. An engagement mechanism is disposed between the inner and outer races. The engagement mechanism is operable to shift to a first position providing torque translation between the inner and outer races in one rotational direction while allowing relative freewheeling rotation between the inner and outer races in an opposite rotational direction. In addition, the engagement mechanism is operable to shift to a second position that provides torque translation and relative freewheeling rotation between the inner and outer races in rotational directions opposite to that provided by the engagement mechanism when disposed in the first position. Furthermore, an actuator assembly is operatively connected to the engagement mechanism. The actuator assembly acts to simultaneously move in an axial direction and rotate about the axis of rotation in an indexing manner in response to a biasing force to shift the engagement mechanism between the first and second positions to selectively provide torque translation and relative freewheeling rotation between the inner and outer races in either rotational direction.

In this way, the clutch assembly can be selectively shifted between operational modes without jamming of the engagement mechanism or other failures occurring at the interface between the inner and outer races of the clutch assembly. Thus, this type of clutch assembly may be employed as a component of an automotive driveline in a transmission, transfer case, or differential to eliminate other components while maintaining the requisite functionality even when transitioning among its various operational modes.

For example, the two-way clutch assembly of the present invention may be employed in conjunction with a friction clutch in a transmission that is used as a holding device. Together, the two-way clutch assembly and the friction device act in conjunction with a planetary gear set to provide low and reverse gears in a transmission. Another advantage of the clutch assembly of the present invention is that when the clutch is deployed with a low/reverse brake in connection with providing low and reverse gear ratios in a transmission, the brake may be closed at all times. In this way, the clutch assembly of the present invention reduces parasitic energy loss, improves operational efficiency, and reduces cost.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
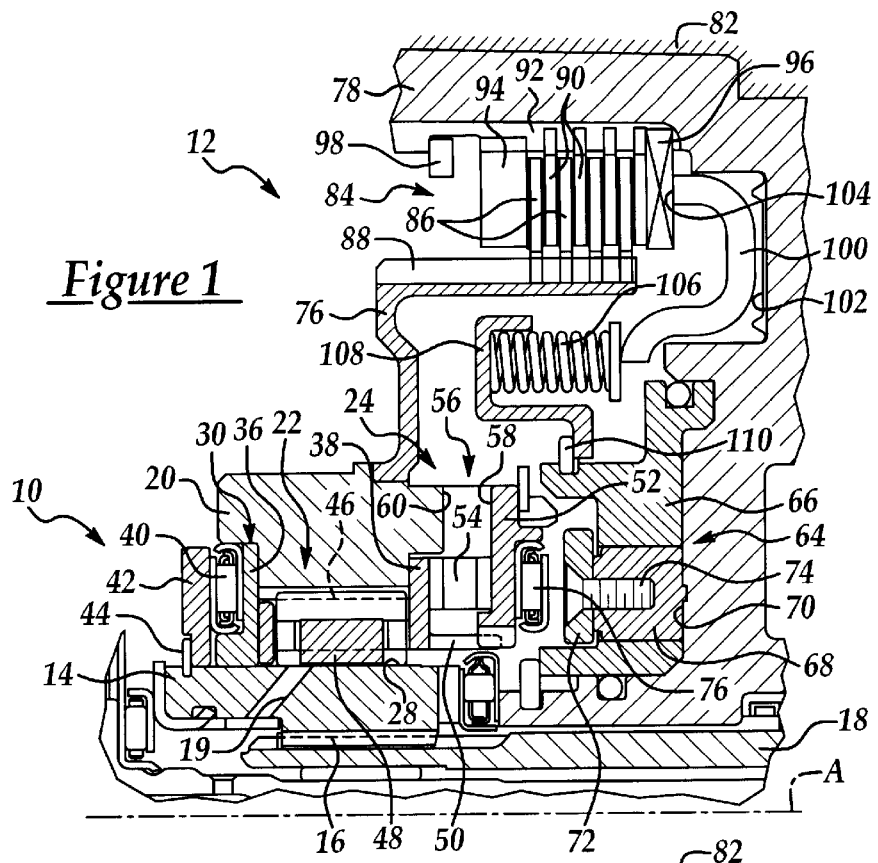
FIG. 1 is a partial cross-sectional side view of one half of a two-way clutch assembly of the present invention mounted in series with a clutch employed as a holding device in a transmission illustrating the engagement mechanism of the two-way clutch assembly disposed in a first position.
Figure 2:
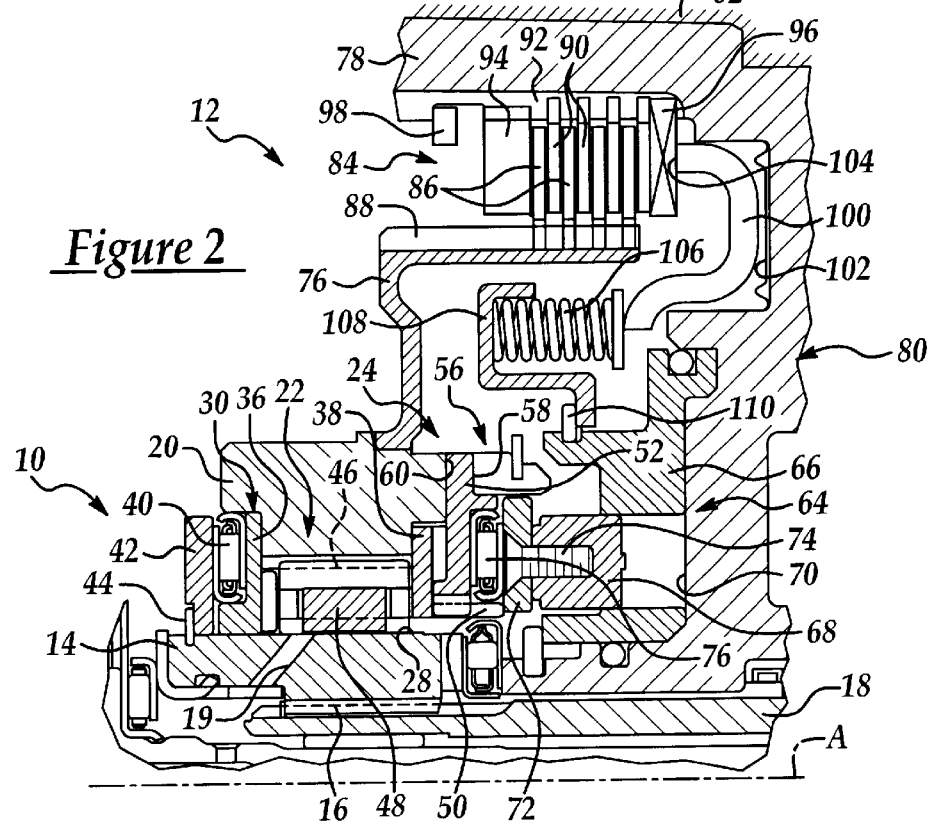
FIG. 2 is a partial cross-sectional side view of one half of a two-way clutch assembly of the present invention mounted in series with a clutch employed as a holding device in a transmission illustrating the engagement mechanism of the two-way clutch assembly disposed in a second position.
Figure 6:
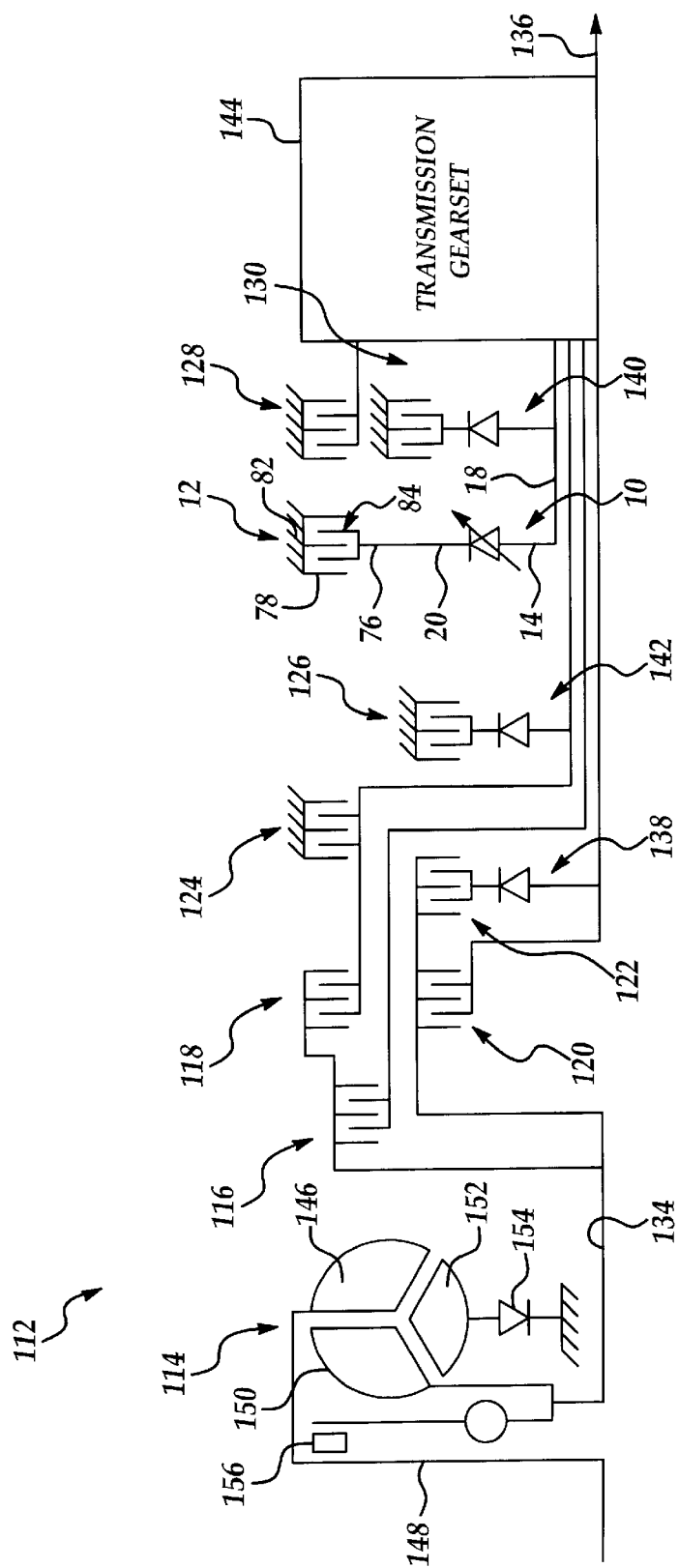
FIG. 6 is schematic diagram depicting a transmission illustrating one possible use of the two-way clutch assembly of the present invention mounted in series with a clutch used as a holding device for providing low and reverse gear ratios.

One half of an annular clutch assembly of the present invention is generally indicated at 10 in FIGS. 1 and 2, where like numerals are used to designate like structure throughout the drawings. In the preferred embodiment illustrated in these figures, the clutch assembly is bi-directional or "two-way" and overrunning. The clutch assembly 10 is particularly adapted for use as a component of drivelines of land-based vehicles, such as in transmissions, transfer cases, differentials and the like. Accordingly, one application for the two-way clutch assembly 10 of this particular type is shown in connection with a friction clutch assembly 12 used as a holding device in a transmission. Together, the two-way clutch assembly and the friction device may act in conjunction with a planetary gear set to provide low and reverse gears in the transmission, as schematically illustrated in FIG. 6. However, those having ordinary skill in the art will appreciate from the description that follows that the two-way clutch assembly 10 of the present invention may be employed in numerous applications, whether or not the application involves providing low or reverse gear ratios.

The two-way clutch assembly 10 includes an inner race 14 that is splined at 16 to a shaft 18. In the example illustrated herein and used to fully describe the features of the present invention, the shaft 18 is operatively connected to a gear set of a transmission. Thus, those having ordinary skill in the art will appreciate that the transmission includes a number of other shafts, gear sets, and clutches as commonly known in the art. The details of a representative transmission will be discussed in greater detail below with reference to FIG. 6. In any event, an outer race 20 is concentrically disposed about the inner race 14 such that the inner and outer races 14, 20 are supported for rotation about a common axis A. An oil passage 19 is formed through the inner race 14 to provide lubrication to the assembly as is commonly known in the art.

The clutch assembly 10 also includes an engagement mechanism, generally indicated at 22, disposed between the inner and outer races 14, 20, respectively. The engagement mechanism 22 is operable to shift between a first position (FIGS. 1 and 4) providing torque translation between the inner and outer races 14, 20, respectively, in one rotational direction while allowing relative freewheeling rotation between the inner and outer races 14, 20 in an opposite rotational direction. In addition, the engagement mechanism 22 is further operable to shift to a second position (FIGS. 2 and 5) that provides torque translation and relative freewheeling rotation between the inner and outer races 14, 20 in rotational directions that are opposite to that provided by the engagement mechanism 22 when disposed in its first position. The bi-directional features of the two-way clutch assembly 10 of the present invention will be described in greater detail below.

In addition to the engagement mechanism, the two-way clutch assembly 10 of the present invention also includes an actuator assembly 24 that is operatively connected to the engagement mechanism 22. The actuating assembly 24 is operable to simultaneously move in an axial direction, parallel to the rotational axis A as well as to rotate about the axis of rotation A in an indexing manner in response to a biasing force. In this way, the actuator assembly 24 shifts the engagement mechanism 22 between its first and second positions to selectively provide torque translation and relative freewheeling rotation between the inner and outer races 14, 20 in either rotational direction. The preferred embodiment and specific functional features of the engagement mechanism 22 and actuator assembly 24 will now be described in greater detail below.

Figure 3:
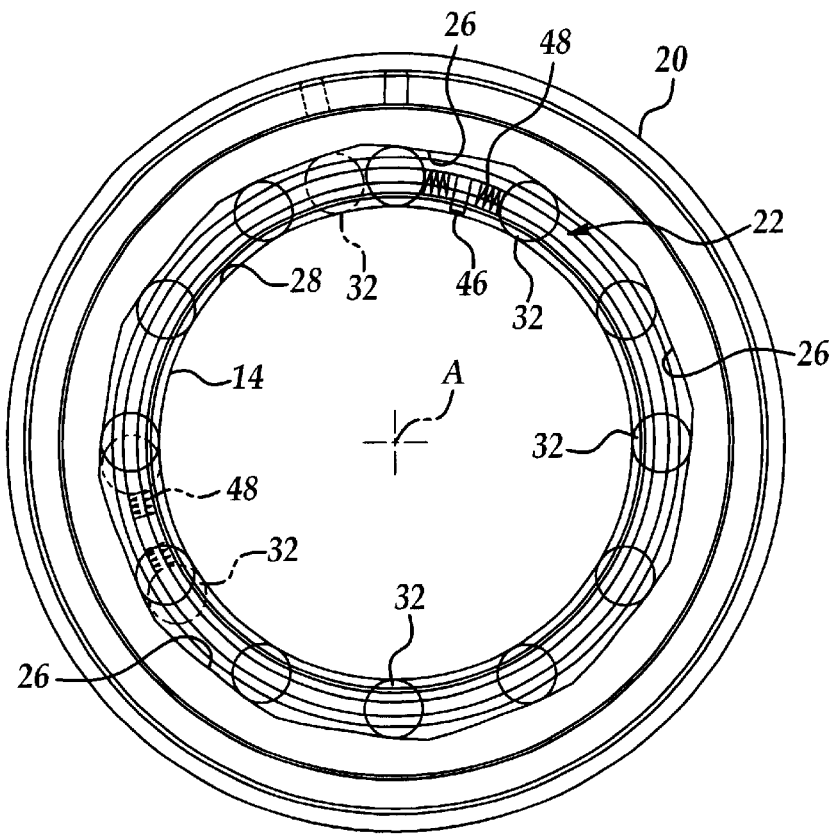
FIG. 3 is a partial cross-sectional side view of a two-way clutch assembly of the present invention illustrating the engagement mechanism disposed in its first position using phantom lines and in its second position using solid lines.

As best shown in FIG. 3, the inner and outer races 14, 20 define a plurality of cam portions 26 between them. In the preferred embodiment, the cam portions 26 are defined on the inner diameter of the outer race 20. However, those having ordinary skill in the art will appreciate from the description that follows that the cam portions 26 may be formed on the outer diameter 28 of the inner race 14 without departing from the scope of the present invention. The engagement mechanism 22 includes a cage assembly, generally indicated at 30 in FIGS. 1 and 2. In addition and referring once again to FIG. 3, the engagement mechanism 22 also includes a plurality of rollers 32 supported by the cage assembly 30 in spaced annular disposition relative to one another about the axis of rotation A. The cage assembly 30 further includes a pair of sidewalls 36, 38 that are disposed spaced from one another and extend annularly about the axis of rotation A. A thrust bearing 40 is located between one of the sidewall 36 and a retainer 42 that is held in place by a snap ring 44 anchored to the inner race 14. A plurality of crossbars 46 extend between the sidewalls 36, 38 and are spaced annularly relative to one another about the axis of rotation A. The rollers 32 are supported axially between the pair of sidewalls 36, 38. Springs 48 are disposed between each crossbar 46 and an adjacent roller 32. The springs 46 act to bias the rollers 32 on either side thereof so that they are generally equally spaced between adjacent crossbars 46 when the cage assembly 30 is in a neutral state.

The cage assembly 30 acts to bias the rollers 32 between the first and second positions. When the rollers 32 are biased to the first position they interact with the cam portions 26 in a wedging or jamming manner to provide torque translation in a first or "forward" rotational direction. At the same, while in this disposition, the engagement mechanism 22 also allows freewheeling relative rotation in the opposite rotational direction. The first position of the engagement mechanism 22 is illustrated using phantom lines in FIG. 3. On the other hand, when the cage assembly 30 is shifted to the second position, the rollers 32 are likewise shifted in an opposite direction so that they engage the cam portions 26 in a wedging or jamming manner so as to translate torque between the inner and outer races 14, 20 in a second or "reverse" direction. At the same time, while disposed in the second position, the engagement mechanism 22 allows relative freewheeling rotation between the inner and outer races in the opposite rotational direction. The second position of the engagement mechanism is shown in solid lines in FIG. 3. It should be appreciated that the designating of one of the two positions as "first" or "forward" and the other position as "second" or "reverse" is merely a relative designation dependant on the application in which the clutch is employed (e.g. transmission or transfer case) and may relate to the relative rotational direction that achieves either a forward or reverse movement of the vehicle.

The cage assembly 30 and more specifically at least one of its sidewalls 38 defines an axially extending splined hub 50 that is adapted to interact with the actuator assembly 24. More specifically, the actuator assembly 24 is operatively coupled to the cage assembly 30 and is selectively rotatable in an indexing fashion about the axis of rotation A to shift the cage assembly 30 and the plurality of rollers 32 between the first and second positions. In this way, the actuator assembly 24 and cage assembly 30 cooperate to selectively provide torque translation and relative freewheeling rotation between the inner and outer races 14, 20 in either rotational direction as the plurality of rollers 32 are selectively moved into and out of engagement with the cam portions 26.

More specifically, in the preferred embodiment, the actuator assembly 24 includes an apply plate 52 operatively supported by the splined hub 50 for axial movement relative thereto. A biasing member 54 is supported between the sidewall 38 and the apply plate 52. In the preferred embodiment, the biasing member 54 may be a wave spring that acts to bias the apply plate 52 to move it axially along the splined hub 50.

Figure 4:
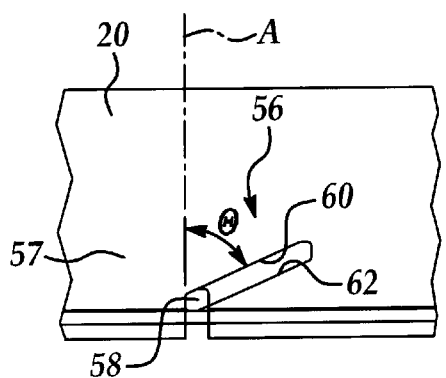
FIG. 4 is a partial top view of the outer race of the two-way clutch assembly of the present invention wherein the engagement mechanism is disposed in its first position.
Figure 5:
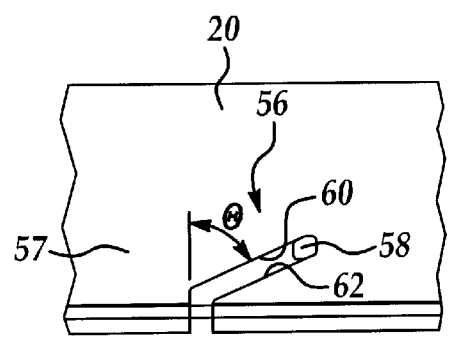
FIG. 5 is a partial top view of the outer race of the two-way clutch assembly of the present invention wherein the engagement mechanism is disposed in its second position.

The outer race 20 includes at least one cam slot, generally indicated at 56, defined on a portion of the outer circumference 57 thereof. The apply plate 52 further includes at least one tooth 58 extending radially relative to the axis of rotation A and cooperatively received in the cam slot 56. More specifically and as best shown in FIGS. 4 and 5, the cam slot 56 extends at an acute angle θ relative to the axis of rotation A and defines a forward cam surface 60 and a reverse cam surface 62. The tooth 58 is operable to slidably move along the reverse cam surface 62 to rotatably index the apply plate 52 and thus the cage assembly 30 to move the rollers 32 from their first position to their second position. Similarly, the tooth 58 is further operable to slidably move along the forward cam surface 60 to rotatably index the apply plate 52 and thus the cage assembly 30 to move the rollers 32 from the first position to the second position. In the preferred embodiment, the annular apply plate 52 includes a plurality of teeth 58 that are cooperatively received in corresponding cam slots 56 to guide the apply plate 52 in a rotationally indexing manner.

The two-way clutch assembly 10 further includes an actuator piston assembly, generally indicated at 64. The actuator piston assembly 64 includes a piston housing 66 and at least one piston 68 moveably supported relative to the piston housing 66. In the preferred embodiment, the two-way clutch assembly 10 includes a plurality of pistons 68 disposed in spaced annular relationship relative to each other about the axis of rotation A. Each of the pistons 68 is moveably supported relative to the piston housing 66 to define a corresponding plurality of expandable chambers 70. An annular ring 72 is mounted to each of the pistons 68 using a flathead screw 74 so as to bridge the space between the pistons 68. A thrust bearing 76 may be disposed between the annular ring 72 and the apply plate 52 of the actuator assembly 24. The annular ring 72 is adapted to contact the thrust bearing 76 to move the apply plate 52 axially relative to the splined hub 50 of the cage assembly 30 thereby causing the apply plate 52 and the cage assembly 30 to rotate in indexing fashion. To this end, a source of pressurized fluid is in communication with the expandable chambers. In turn, each piston 68 is responsive to the pressure of the fluid in the expandable chambers 70 to move into engagement with the apply plate 52 (FIG. 2). In the absence of sufficient pressure in the expandable chambers, the wave spring 54 biases the apply plate 52 axially along the splined hub 50 such that the cage assembly 30 moves from its second position to its first position (FIG. 1).

As noted above and in the embodiment representatively illustrated herein, the two-way clutch assembly 10 is associated with a friction clutch assembly 12. The friction clutch assembly 12 includes an inner hub 76 and an outer hub 78. The inner and outer hubs 76, 78 cooperate to define a clutch housing, generally indicated at 80. The outer hub 78 is fixed to the transmission casing 82 and the inner hub 76 is operatively connected to the outer race 20 of the two-way clutch assembly 1 0. Thus, an in the configuration illustrated in FIGS. 1, 2, and 6, the friction clutch assembly 12 and the two-way clutch assembly 10 are mounted in series relative to each other for a purpose that will be discussed in greater detail with reference to FIG. 6.

A clutch pack, generally indicated at 84, is interposed between the inner hub 76 and the outer hub 78. The clutch pack 84 is operable to connect and disconnect the inner and outer hubs 76, 78, respectively, for translating and interrupting torque therebetween. To this end, the clutch pack 84 includes a plurality of annular plates 86 splined at 88 to the inner hub 76. In addition, the clutch pack 84 includes a plurality of annular friction discs 90 that are splined at 92 to the outer hub 78 and interleaved between the annular plates 86. A backing plate 94 as well as a pressure plate 96 are splined to the outer hub 78 and bracket the clutch pack 84. A snap ring 98 mounted on the outer hub 78 limits the travel of the backing plate 94 along the splines 92.

A piston 100 is moveably supported relative to the clutch housing 80 and cooperates with the clutch housing 80 to define an expandable chamber 102 between the piston 100 and the outer hub 78. A source of pressurized fluid is in communication with the expandable chamber 102. The piston 100 is responsive to the pressure of fluid in the expandable chamber 102 to move between a disengaged position wherein the inner hub 76 and outer hub 78 are disconnected and an engaged position that connects the inner and outer hubs through the clutch pack 84. To this end, the piston 100 includes a head 104 that is adapted for compressive engagement with the pressure plate 76 and thus the clutch pack 84. A return biasing member 106 acts on the piston 100 to move the piston to its disengaged position in a direction opposite to the movement of the piston 100 in response to the forces generated by the pressurized fluid. In the preferred embodiment, the biasing member 106 is a coiled spring captured between a retainer 108 that is supported on the two-way clutch piston housing 66 in conjunction with a snap ring 110. Similarly, the two-way clutch piston housing 66 is supported by the friction clutch housing 80.

In this way, the clutch assembly 10 can be effectively shifted between operational modes without jamming of the engagement mechanism or other failures occurring at the interface between the inner and outer races of the clutch assembly. Thus, this type of clutch assembly may be employed as a component of an automotive driveline in a transmission, transfer case, or differential to eliminate other components while maintaining the requisite functionality even when transitioning among its various operational modes.

One representative example of an advantageous use of the two-way clutch assembly of the present invention is shown in connection with a transmission, schematically illustrated at 112 in FIG. 6. The transmission 112 has a number of conventional components that are arranged to translate torque between a prime mover, such as an internal combustion engine (not shown) and the output of the transmission at various gear ratios. However, those having ordinary skill in the art will appreciate that the standard components of a transmission may be arranged in numerous ways to provide various gear ratios.

To this end, the transmission 112 includes a torque converter, generally indicated at 114, and a plurality of multi-plate friction disc clutches 116, 118,120, 122, 124, 126, 128, and 130, or similar mechanisms that serve as holding mechanisms or brakes to translate torque between the primary transmission input shaft 134 and the primary transmission output shaft 136 acting through one-way clutches 138, 140, 142, as well as a plurality of planetary gear sets schematically represented at 144, as is commonly known in the art. In addition, the transmission 112 includes a two-way clutch assembly 10 and friction clutch 12 as will be described in greater detail below.

The torque converter 114 includes an impeller assembly 146 operatively connected for rotation with the torque input member 148 from the internal combustion engine, a turbine assembly 150 fluidly connected in driven relationship with the impeller assembly 146 and a stator assembly 152. These assemblies together form a substantially toroidal flow passage for kinetic fluid in the torque converter 114. Each assembly includes a plurality of blades or vanes that act to convert mechanical energy into hydrokinetic energy and back to mechanical energy. The stator assembly 152 of a conventional torque converter is locked against rotation in one direction but is free to spin about an axis in the direction of rotation of the impeller assembly 146 and the turbine assembly 150. A one-way clutch 154 is often employed for this purpose. When the stator assembly 152 is locked against rotation, the torque is multiplied by the torque converter. During torque multiplication, the output torque is greater than the input torque for the torque converter 114. In addition, conventional torque converters often employ clutches 156 interposed between the torque input member 148 and the turbine assembly 150 which are engaged and "lock up" at higher speed ratios (speed output/speed input). When the clutch 156 is locked up, there is a direct torque translation between the torque input member 148 and the transmission 114 through the turbine assembly 150.

In the particular transmission 112 illustrated in FIG. 6, the clutches are employed as holding mechanisms to translate torque from the primary transmission input shaft 134 to various ones of the planetary gear sets 144, as the case may be. Thus, in the representative transmission 112, clutch 116 is active to effect fourth gear. Clutch 118 is closed when the transmission is in reverse gear. Clutch 120 serves as an automatic overdrive clutch that is active in all forward gears. Clutch 122 is an input clutch that is operatively coupled to the one-way clutch designated at 138 and is closed when the vehicle is in any forward gear. Clutch 124 is active when the transmission is in fifth gear. Friction clutch 126 is operatively coupled to one-way clutch 142 and is active as a holding device to effect third gear. An intermittent brake clutch 128 is active when the transmission is in manual second gear. Otherwise, this friction clutch remains open. Friction clutch 130 cooperates with one-way clutch 140 and acts as a holding device when the transmission is in second gear. In turn, each of the planetary gear sets 144 include a sun gear operatively coupled to one of the clutches identified above, a ring gear disposed about the respective sun gear, and a plurality of pinion or planetary gears disposed in meshing relationship between the respective sun and ring gears.

In the representative embodiment illustrated herein, the bi-directional overrunning clutch assembly 10 is employed in connection with the friction clutch 12 that serves as a low/reverse brake for the planetary gear set that is used to provide low and reverse gear ratios. As noted above, the outer hub 78 of the friction clutch 12 is grounded to the transmission casing 82. The inner hub 76 of the friction clutch is operatively connected to or otherwise integrated with the outer race 20 of the two-way clutch assembly 10. In this way, the two-way clutch assembly 10 and the friction clutch assembly 12 are said to be mounted in "series." When in Drive and low (or first) gear, the clutch 10 functions as a forward driving one-way overrunning clutch by having the actuator assembly 24 and thus the engagement mechanism 22 disposed in the first or "forward" position. The friction clutch 12 is closed and thus the clutch pack 84 is engaged. Torque is translated to the appropriate gear set through the shaft 18. When in Drive and any higher gear, the two-way clutch assembly 10 freewheels in the opposite rotational direction. The clutch pack 84 remains closed. No torque is translated via the shaft 18.

In contrast, conventional transmissions of the type known in the related art typically employ a one-way clutch mounted "in parallel" with respect to the low and reverse brake clutch. When the transmission is in Drive and in any higher gear, the associated friction clutch must remain in open pack mode in order to prevent torque from being translated to the low gear set via shaft 18. Operating this clutch in open pack mode creates parasitic losses. Thus, the two-way clutch assembly 10 of the present invention employed in series with a friction clutch 12 serving as a low or reverse brake clutch eliminates the parasitic losses that would otherwise occur in all higher gears. When in Reverse gear, the actuator and thus the engagement mechanism 22 is disposed in the second or "rear" position so that the shaft 136 drives the vehicle in reverse. At the same time, the clutch assembly 10 will freewheel in the opposite direction. Accordingly, the friction clutch 12 may also remain closed in this operational mode.

Thus, the bi-directional or "two-way" overrunning clutch assembly provides the two distinct modes of operation as illustrated in FIGS. 1–2. More specifically, the two-way clutch assembly of the present invention can be selectively shifted between operational modes without jamming of the engagement mechanism or other failures occurring at the interface between the inner and outer races of the clutch assembly. This type of bi-directional overrunning clutch assembly may be employed as a component of an automotive driveline in a transmission, transfer case, or differential to eliminate other components while maintaining the requisite functionality when controlled by the present invention. When the clutch is mounted in series with a friction clutch 12 in connection with providing low and reverse gear ratios in the representative transmission illustrated in FIG. 6, the multi-disc friction clutch is always closed. In this way, the two-way clutch assembly 10 by the present invention may be employed to reduce parasitic energy loss, improves operational efficiency, and reduces cost.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

I claim:

1. A two-way clutch assembly (10) comprising:

an inner race (14), an outer race (22) wherein said inner and outer races are supported for rotation about a common axis (A) and wherein said inner and outer races (14, 20) define cam portions (26) between them;

an engagement mechanism (22) disposed between said inner and outer races, said engagement mechanism (22) including a cage assembly (30) and a plurality of rollers (32) supported by said cage assembly (30) in spaced annular disposition relative to one another about said axis of rotation (A), said cage assembly (30) including an axially extending splined hub (50), said engagement mechanism (22) operable to shift between a first position providing torque translation between said inner and outer races (14, 20) in one rotational direction while allowing relative freewheeling rotation between said inner and outer races (14, 20) in an opposite rotational direction and a second position providing torque translation and relative freewheeling rotation between said inner and outer races (14, 20) in rotational directions opposite to that provided by said engagement mechanism when disposed in said first position; and an actuator assembly (24) that is operatively connected to said cage assembly (30) and includes an apply plate (52) operatively supported by said splined hub (50) for axial movement relative thereto, said actuator assembly (24) operable to simultaneously move in an axial direction and rotate about said axis of rotation (A) in an indexing manner in response to a biasing force to shift said cage assembly (30) and said plurality of rollers (32) between said first and second positions to selectively provide torque translation and relative freewheeling rotation between said inner and outer races (14, 20) in either rotational direction as said plurality of rollers (32) are selectively moved into and out of engagement with said cam portions (26).

2. A two-way clutch assembly (10) as set forth in claim 1 wherein said cage assembly (30) includes a pair of sidewalls (36, 38) disposed spaced from one another and extending annularly about said axis of rotation (A), said plurality of rollers (32) supported axially between said pair of sidewalls (36, 38), at least one of said sidewalls (38) defining said axially extending splined hub (50), a biasing member (54) supported between said at least one sidewall (38) and said apply plate (52), said biasing member (54) acting to bias said apply plate (52) to move it axially along said splined hub (50) and to move said cage assembly (30) from said second position to said first position.

3. A two-way clutch assembly (10) as set forth in claim 1 wherein said outer race (20) includes at least one cam slot (56) defined therein and said apply plate (52) further includes at least one tooth (58) extending radially relative to said axis of rotation (A) and cooperatively received in said cam slot (56) so as to cause said apply plate (52) and said cage assembly (30) to rotate in an indexing fashion in response to movement of said apply plate (52) in an axial direction.

4. A two-way clutch assembly (10) as set forth in claim 3 wherein said cam slot (56) extends at an acute angle (θ) relative to said axis of rotation (A) and defines a forward cam surface (60) and a reverse cam surface (62), said tooth (58) operable to slidably move along said reverse cam surface (62) to index said apply plate (52) and said cage assembly (30) to move said rollers (32) from said first position to said second position, said tooth (58) further operable to slidably move along said forward cam surface (65) to index said apply plate (52) and said cage assembly (30) to move said rollers (32) from said first position to said second position.

5. A two-way clutch assembly (10) as set forth in claim 1 further including an actuator piston assembly (64) including a piston housing (66) and at least one piston (68) moveably supported relative to said piston housing (66) and operable to move said actuator assembly (24) axially relative to said cage assembly (30).

6. A two-way clutch assembly (10) as set forth in claim 5 wherein said piston (68) cooperates with said piston housing (66) to define an expandable chamber (70), a source of pressurized fluid in communication with said expandable chamber (70) wherein said piston (68) is responsive to the pressure of the fluid in said expandable chamber (70) to move said actuator assembly (24) axially relative to said cage assembly (30) so as to move said plurality of rollers (32) from said first position to said second position.

7. A two-way clutch assembly (10) as set forth in claim 6 wherein said two-way clutch assembly includes a plurality of pistons (68) disposed in spaced annular relationship relative to each other about said axis of rotation (A) and moveably supported relative to said piston housing (66) to define a corresponding plurality of expandable chambers (70), an annular ring (72) mounted to said plurality of pistons (68) so as to bridge the space between said pistons (68), and a thrust bearing (76) disposed between said annular ring (72) and said actuator assembly (24), said annular ring (72) adapted to contact said thrust bearing (76) to move said actuator assembly (24) axially relative to said cage assembly (30).

8. A two-way clutch assembly (10) as set forth in claim 1 wherein said inner race (14) is operatively supported for rotation with a shaft (18), said outer race (20) is operatively connected to a friction clutch assembly (12) such that said two-clutch assembly (10) is mounted in series relative to said friction clutch assembly (12).

9. A two-way clutch assembly (10) as set forth in claim 8 wherein said friction clutch assembly (12) includes an inner hub (76) and an outer hub (78), said inner and outer hubs cooperating to define a clutch housing (80) therebetween, a clutch pack (84) interposed between said inner hub (76) and said outer hub (78) and operable to connect and disconnect said inner and outer hubs for translating and interrupting torque therebetween;

a piston (100) supported by said clutch housing (80) and moveable between a disengaged position wherein said inner hub (76) and outer hub (78) are disconnected and an engaged position that connects said inner and outer hubs through said clutch pack (84).

10. A two-way clutch assembly (10) as set forth in claim 9 wherein said clutch pack (84) includes a plurality of annular plates (86) splined to said inner hub (76) and a plurality of annular friction discs (90) splined to said outer hub (78) and interleaved between said annular plates (86), said annular plates (86) and discs (90) rotating relative to one another in substantial non-contacting relationship when said clutch pack (84) is disconnected thereby interrupting torque translation between said inner and outer hubs and fixed substantially together when said clutch pack (84) is connected thereby translating torque between said inner and outer hubs such that said inner and outer hubs are held stationary.

11. A two-way clutch assembly (10) as set forth in claim 9 wherein said piston (100) cooperates with said clutch housing (80) to define an expandable chamber (102) between said piston (100) and said clutch housing (80);

a source of pressurized fluid in communication with said expandable chamber, (102), said piston (100) being responsive to the pressure of fluid in said expandable chamber (102) to move between said disengaged and said engaged positions thereby actuating said clutch pack (84) to connect and disconnect said inner hub (76) and said outer hub (78).

12. An automotive transmission assembly (112) having at least one shaft (18) and at least one gear set (144) operatively coupled to said shaft and adapted to provide low and reverse gear ratios, said transmission assembly comprising:

a transmission casing (82) for supporting the shaft (18) and the gear set (144) of said transmission assembly;

a two-way clutch assembly (10) having an inner race (14) operatively mount d to the shaft (18) and an outer race (20) wherein said inner and outer races are supported for rotation about a common axis (A), a friction clutch assembly (12) including an inner hub (76) and an outer hub (78) wherein said outer hub (78) is fixed to said transmission casing (82) and said inner hub (76) is operatively connected to said outer race (20) of said two-way clutch assembly (10) such that said friction clutch assembly (12) and said two-way clutch assembly (10) are mounted in series relative to each other;

a clutch pack (84) interposed between said inner hub (76) and said outer hub (78) and operable to connect said inner and outer hubs together;

an engagement mechanism (22) disposed between said inner and outer races (14, 20) of said two-way clutch assembly (10), said engagement mechanism (22) operable to shift be ween a first position providing torque translation between said inner and outer races (14, 20) in the forward rotational direction when said transmission assembly (112) is in low gear while allowing relative freewheeling rotation between said inner and outer races ( 14, 20) in an opposite rotational direction when said transmission assembly (112) is in any higher gear and a second position providing torque translation and relative freewheeling rotation between said inner and outer races (14, 20) in the reverse rotational direction when said transmission assembly (112) is in reverse gear while allowing relative freewheeling rotation between said inner and outer races (14, 20) in an opposite rotational direction when said transmission assembly (112) is in any gear greater than first gear; and an actuator assembly (24) that is operatively connected to said engagement mechanism (22), said actuator assembly (24) operable to simultaneously move in an axial direction and rotate about said axis of rotation (A) in an indexing manner in response to a biasing force to shift said engagement mechanism (22) between said first and second positions to selectively provide torque translation and relative freewheeling rotation between said inner and outer races (14, 20) in either rotational direction.

13. An automotive transmission assembly (112) as set forth in claim 12 wherein said inner and outer races (14, 20) define cam portions (26) between them, said engagement mechanism (22) includes a cage assembly (30) and a plurality of rollers (32) supported by said cage assembly (30) in spaced annular disposition relative to one another about said axis of rotation (A), said actuator assembly (24) operatively coupled to said cage assembly (30) and selectively rotatable in indexing fashion about said axis of rotation (A) to shift said cage assembly (3) and said plurality of rollers (30) between said first and second positions to selectively provide torque translation and relative freewheeling rotation between said inner and outer races (14, 20) in either rotational direction as said plurality of rollers (30) are selectively moved into and out of engagement with said cam portions (26).

14. An automotive transmission assembly (112) as set forth in claim 13 wherein said cage assembly (30) includes an axially extending splined hub (50), said actuator assembly (24) including an apply plate (52) operatively supported by said splined hub (50) for axial movement relative thereto.

15. An automotive transmission assembly (112) as set forth in claim 14 wherein said cage assembly (30) includes a pair of sidewalls (36, 38) disposed spaced from one another and extending annularly about said axis of rotation (A), said plurality of rollers (32) supported axially between said pair of sidewalls (36, 38), at least one of said sidewalls (38) defining said axially extending splined hub (50), a biasing member (54) supported between said at least one sidewall (38) and said apply plate (52), said biasing member (56) acting to bias said apply plate (52) to move it axially along said splined hub (50) and to move said engagement mechanism (22) from said second position to said first position.

16. An automotive transmission assembly (112) as set forth in claim 13 wherein said outer race (20) includes at least one cam slot (56) defined therein and said apply plate (52) further includes at least one tooth (58) extending radially relative to said axis of rotation (A) cooperatively received in said cam slot (56) so as to cause said apply plate (52) and said cage assembly (30) to rotate in an indexing fashion in response to movement of said apply plate (52) in an axial direction.

17. An automotive transmission assembly (112) as set forth in claim 16 wherein said cam slot (56) extends at an acute angle (θ) relative to said axis of rotation (A) and defines a forward cam surface (60) and a reverse cam surface (62), said tooth (58) operable to slidably move along said reverse cam surface (62) to index said apply plate (52) and said cage assembly (30) to move said rollers (32) from said first position to said second position, said tooth (58) further operable to slidably move along said forward cam surface (60) to index said apply plate (52) and said cage assembly (30) to move said rollers (32) from said first position to said second position.

18. An automotive transmission assembly (112) as set forth in claim 13 further including an actuator piston assembly (64) including a piston housing (66) and at least one piston (68) moveably supported relative to said piston housing (66) and operable to move said actuator assembly (24) axially relative to said cage assembly (30).

* * * * *